United States Patent [19]
Guthrie et al.

[11] Patent Number: 5,729,235
[45] Date of Patent: Mar. 17, 1998

[54] COHERENT GPS TRANSLATOR WITH SPREAD SPECTRUM PILOT TONE

[75] Inventors: Warren E. Guthrie, Glen Ellyn; Robert Rozak, Evanston; Thomas E. Szmurlo, Palatine, all of Ill.

[73] Assignee: Northrop Grumman Corporation, Los Angeles, Calif.

[21] Appl. No.: 571,815

[22] Filed: Dec. 13, 1995

[51] Int. Cl.⁶ ............................................. G01S 5/02
[52] U.S. Cl. ................................ 342/357; 375/200
[58] Field of Search .............................. 342/352, 357; 455/12.1; 375/200

[56] References Cited

U.S. PATENT DOCUMENTS

| | | | |
|---|---|---|---|
| 4,064,422 | 12/1977 | Masak | 364/841 |
| 4,457,003 | 6/1984 | Reed | 375/1 |
| 4,622,557 | 11/1986 | Westerfield | 342/351 |
| 4,726,069 | 2/1988 | Stevenson | 455/46 |
| 4,910,525 | 3/1990 | Stulken | 342/418 |
| 4,990,922 | 2/1991 | Young et al. | 342/52 |
| 5,036,523 | 7/1991 | Briskman | 375/1 |
| 5,222,099 | 6/1993 | Hori et al. | 375/1 |
| 5,225,842 | 7/1993 | Brown et al. | 342/357 |
| 5,271,034 | 12/1993 | Abaunza | 375/1 |
| 5,280,295 | 1/1994 | Kelley et al. | 342/463 |
| 5,309,474 | 5/1994 | Gilhousen et al. | 375/1 |
| 5,311,194 | 5/1994 | Brown | 342/357 |
| 5,379,224 | 1/1995 | Brown et al. | 364/449 |
| 5,512,902 | 4/1996 | Guthrie et al. | 342/357 |

Primary Examiner—Thomas H. Tarcza
Assistant Examiner—Dao L. Phan
Attorney, Agent, or Firm—Terry J. Anderson; Karl J. Hoch, Jr.

[57] ABSTRACT

A translator for translating GPS signals received at one location to a different frequency for ground transmission to another location uses a spread spectrum pilot tone for phase-locking the local oscillator of the ground transmitter to that of the ground receiver, thereby increasing security, enabling use of otherwise unavailable frequency spectra, allowing coherence of pilot tone and GPS signal with small coherence bandwidths, and allowing interference-free transmission of the translated GPS signal and pilot tone with the same center frequency.

10 Claims, 5 Drawing Sheets

COHERENT GPS TRANSLATOR WITH SPREAD SPECTRUM PILOT TONE

FIELD OF THE INVENTION

This invention relates generally to translators for the ground transmission of global positioning system (GPS) signals, and more particularly to a coherent translator using a spread spectrum pilot tone.

BACKGROUND OF THE INVENTION

GPS locator systems for ascertaining the position of a transceiver platform are well known. Originally developed for military applications requiring precise targeting of long-range missiles, GPS locating technology has expanded into many civilian as well as military areas of use.

Typically, the GPS receiver platform is an aircraft, ship or vehicle which needs to track its precise location for navigational or traffic control purposes. Sometimes, however, it is necessary for an operator at a central station to keep track of several moving platforms such as military equipment, persons, police cars or taxicabs. In such cases, the moving platforms are conventionally equipped with GPS translators which receive a low-power, composite GPS signal from satellites, alter the signal frequency, and retransmit the signal at a higher power level in the ground-communications frequency spectrum. The retransmitted signals from various moving platforms in the field are received by the central station, and are re-translated and decoded to provide a display of the platforms' locations.

Although a simple retransmission of the GPS signal is feasible for some installations, the more advanced GPS receivers commonly in use today need a more sophisticated translated signal. These receivers exploit the signal structure of the GPS signal transmitted by the satellites to improve the accuracy and repeatability of the solution (i.e. the platform's location output). They do this by phase tracking of the GPS carrier. The GPS signal structure allows phase tracking to be used since the GPS spreading code (which causes the GPS signal to change frequencies within a predetermined frequency band in a predetermined pattern) has a coherence with respect to the carrier phase (i.e., an exact number of phase cycles in the carrier elapse for every code chip). This coherence allows the carrier phase to smooth the code tracking loop, and the result is a higher accuracy solution with less variance (i.e. a less noisy solution).

Phase tracking is conventionally accomplished by adding to the retransmitted GPS signal a pilot tone which is phase locked to the local oscillator (LO) of the translator but at a different frequency. In the receiver at the central station, the pilot tone is sampled either before or after the mixer, and is used as a reference for phase-locking the re-translator's LO in synchronism with the translator's LO.

Conventional translators use a continuous-wave (CW) pilot tone at a frequency removed from the translated GPS signal for easy separation from the GPS signal by the re-translator. Although this CW approach has proven generally suitable for its intended purpose, it possesses inherent deficiencies which detract from its overall effectiveness and desirability.

Specifically, these deficiencies are three-fold: First, a CW pilot tone is easily recognized and jammed by hostile persons or forces. Secondly, the required CW pilot tone is illegal, under the regulations of the Federal Communications commission (FCC) in certain frequency bands which are useful for land mobile communications. Thirdly, the choice of a CW tone runs into two inconsistent requirements: on the one hand, the CW tone must be well removed from the translated frequency band, or else the GPS signal is likely to interfere with the pilot tone recovery (i.e. phase locking) process, and the pilot tone is likely to interfere with the GPS signal. On the other hand, removing the pilot tone frequency from the translated frequency sufficiently to eliminate any interference from the GPS signal would likely require the tone frequency offset to be more than the coherence bandwidth of the radio-frequency channel being used.

As a matter of example, the coherence bandwidth for land mobile communications at 900 MHz is about 30 KHz, yet the translated GPS signal is anywhere from 2 to 20 MHz wide. Consequently, choosing a pilot tone frequency inside the coherence band free of GPS signal interference is not possible.

The result of choosing a pilot tone frequency outside the coherence band is that the received pilot tone would no longer be phase coherent with the received translated GPS signal. Consequently, any LO locked to the pilot tone at the retranslator would not be phase coherent with the received GPS signal either. Any attempt to retranslate the received GPS signal to its original frequency with the retranslator LO would then distort the original GPS signal.

In view of these shortcomings of the prior art, it is desirable to provide a GPS translator using a simple, inexpensive translator which is reliable and, for some applications, capable of being made small enough to be concealed on an object or person, and which is difficult for a hostile person or force to jam. Consequently, although the prior art has recognized to a limited extent the problems of accuracy and security, the proposed solutions have, to date, been ineffective in providing a satisfactory remedy.

The prior art includes the following references:

U.S. Pat. No. 5,036,523 to Briskman shows a satellite-communications system using a spread spectrum carrier and a pilot tone as a frequency reference. Interference between the pilot tone and the transmitted data is avoided by inserting the pilot tone at a null point in the power vs. frequency spectrum of the transmitted spread spectrum signal.

U.S. Pat. No. 5,309,474 to Gilhousen et al. concerns a cellular telephone system using a spread spectrum with separate pilot, synchronization, paging and voice channels.

U.S. Pat. No. 4,457,003 to Reed uses phase modulated information carried by a pilot tone to synchronize the transmitter's hop schedule in a spread-spectrum system with the receiver's dehop schedule.

U.S. Pat. No. 5,280,295 to Kelley discloses a mobile ground location system using a comparison of the phases of the 19 KHz pilot tones of commercial FM stations to the phases of the same tones as seen and transmitted by a fixed base station.

U.S. Pat. No. 5,222,099 to Hori et al. discloses apparatus for dehopping a received spread spectrum signal.

U.S. Pat. No. 5,311,194 to Brown uses a pseudolite transmitter to provide three-dimensional position information to an aircraft using GPS in an automatic landing mode.

U.S. Pat. No. 5,271,034 to Abaunza concerns the demodulation of spread-spectrum GPS signals in a receiver.

U.S. Pat. No. 5,225,842 to Brown et al. discloses a vehicle tracking system in which sensors on the vehicles transmit raw GPS data to a central workstation.

U.S. Pat. No. 4,726,069 to Stevenson relates to an anti-fading arrangement in a single sideband communications system, wherein a pilot tone is generated in an upper sideband to provide fading information.

U.S. Pat. No. 4,990,922 to Young et al. discloses an aircraft-mounted GPS system for measuring ocean currents by radar.

U.S. Pat. No. 4,064,422 to Masak shows an adaptive processor using a CW pilot tone.

SUMMARY OF THE INVENTION

The present invention specifically addresses and alleviates the above-mentioned deficiencies associated with the prior art. More particularly, the present invention comprises using a spread spectrum pilot tone instead of a CW tone in a GPS translator. This has several advantages: Firstly, the pilot tone is difficult to jam and, for that matter, not even readily recognizable as a pilot tone; secondly, the distribution of the pilot tone power over a large frequency band makes it possible to conform the pilot tone to FCC standards for land communications; and thirdly, the spread-spectrum pilot tone and the translated GPS signal can be at exactly the same frequency, thereby eliminating the coherence bandwidth problem.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 2b is a frequency-power diagram illustrating the frequency distribution in the translator of FIG. 2a;

DETAILED DESCRIPTION OF THE INVENTION

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
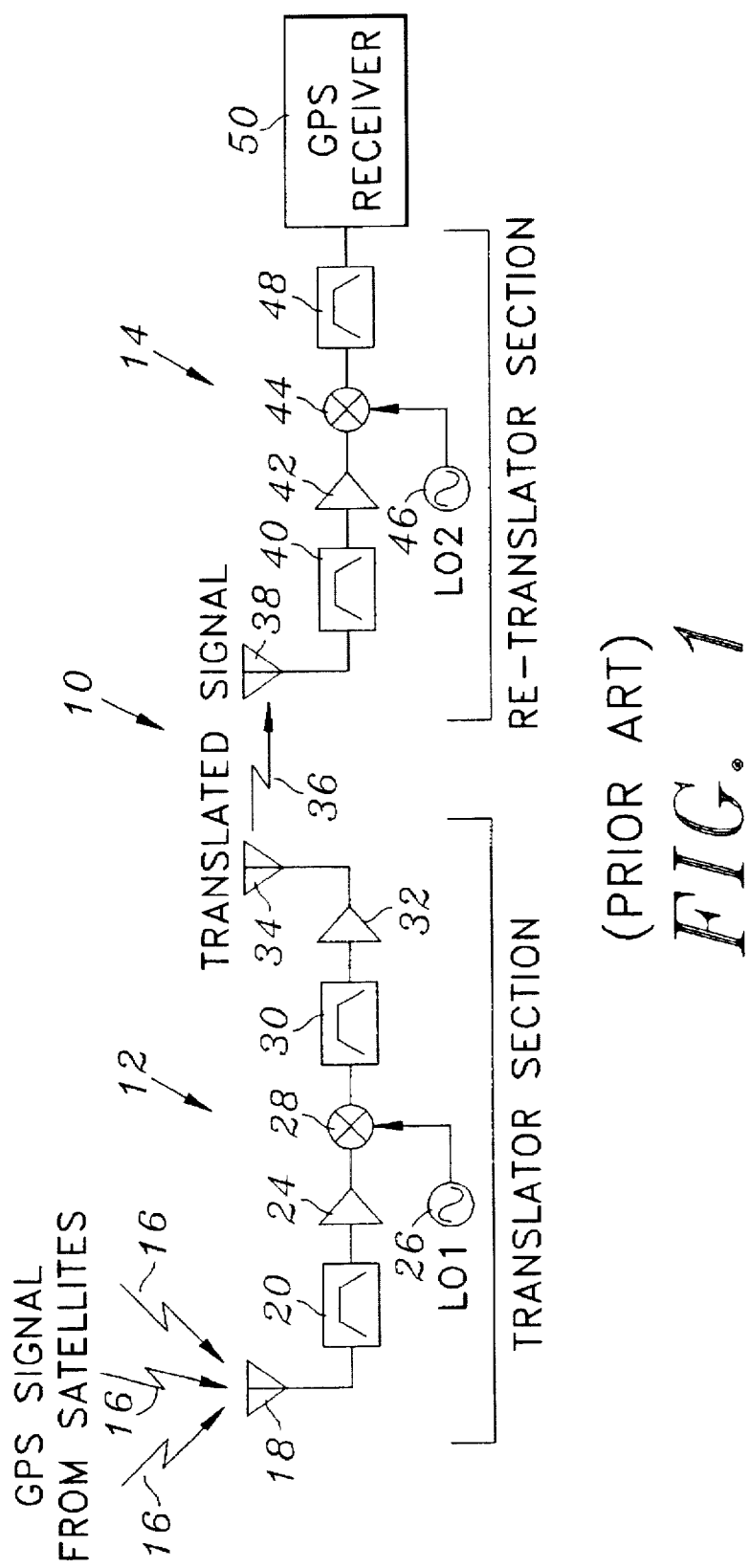
FIGS. 1 and 2a are block diagrams illustrating prior art translators.

FIG. 1 shows an elementary prior art GPS translation system 10 consisting of a translator 12 and a re-translator 14. The translator 12 may typically be positioned on a mobile platform such as a missile or land vehicle, and the re-translator 14 may be positioned at a fixed central station. The low-power GPS signals 16 from various satellites (not shown) are received by the mobile platform's antenna 18 and are processed through a preselect bandpass filter 20 at a nominal center frequency of 1575 MHz. The actual GPS signals 16 are spread spectrum signals, i.e. their carrier frequency varies at frequent intervals about a center frequency and within a predetermined frequency range in accordance with a predetermined code. The distribution of the signal power within that frequency range is generally, dome-shaped as illustrated by the curve 22 in FIGS. 2b and 3b.

The incoming GPS signals 15 are next amplified in amplifier 24 and then mixed with the output of a local oscillator 26 in a mixer 28. The local oscillator frequency may be, for example, 650.5 MHz, in which case the mixer produces, among other things, a spread spectrum translated GPS signal 36 with a center frequency of 1575−650.5=924.5 MHz. This translated signal is passed through a bandpass filter 30, amplified at 32, and transmitted from the antenna 34 as a relatively high-power ground communications signal.

In the re-translator 14, the signal 36 is received by the antenna 38, filtered through band-pass filter 40, amplified at 42, and then mixed at 44 with the output of a local oscillator 46. The frequency of the local oscillator 46 is the same as that of oscillator 26, so that a reconstituted GPS signal with a center frequency of 1575 MHz can be produced by the mixer 44. This reconstituted GPS signal can now be passed through the bandpass filter 48 and applied to a GPS receiver 50 for analysis and use.

The basic translation system 10 of FIG. 1 does work, but its accuracy suffers from the fact that there is no way to synchronize or phase-lock oscillators 26 and 46 to each other. Consequently, the prior art has used the arrangement shown in FIG. 2a, in which a pilot tone 52 generated by oscillator 54 is added to the signal 36 in amplifier 32. Oscillator 54 is phase locked to oscillator 26 by a phase lock circuit 56.

Figure 2A:
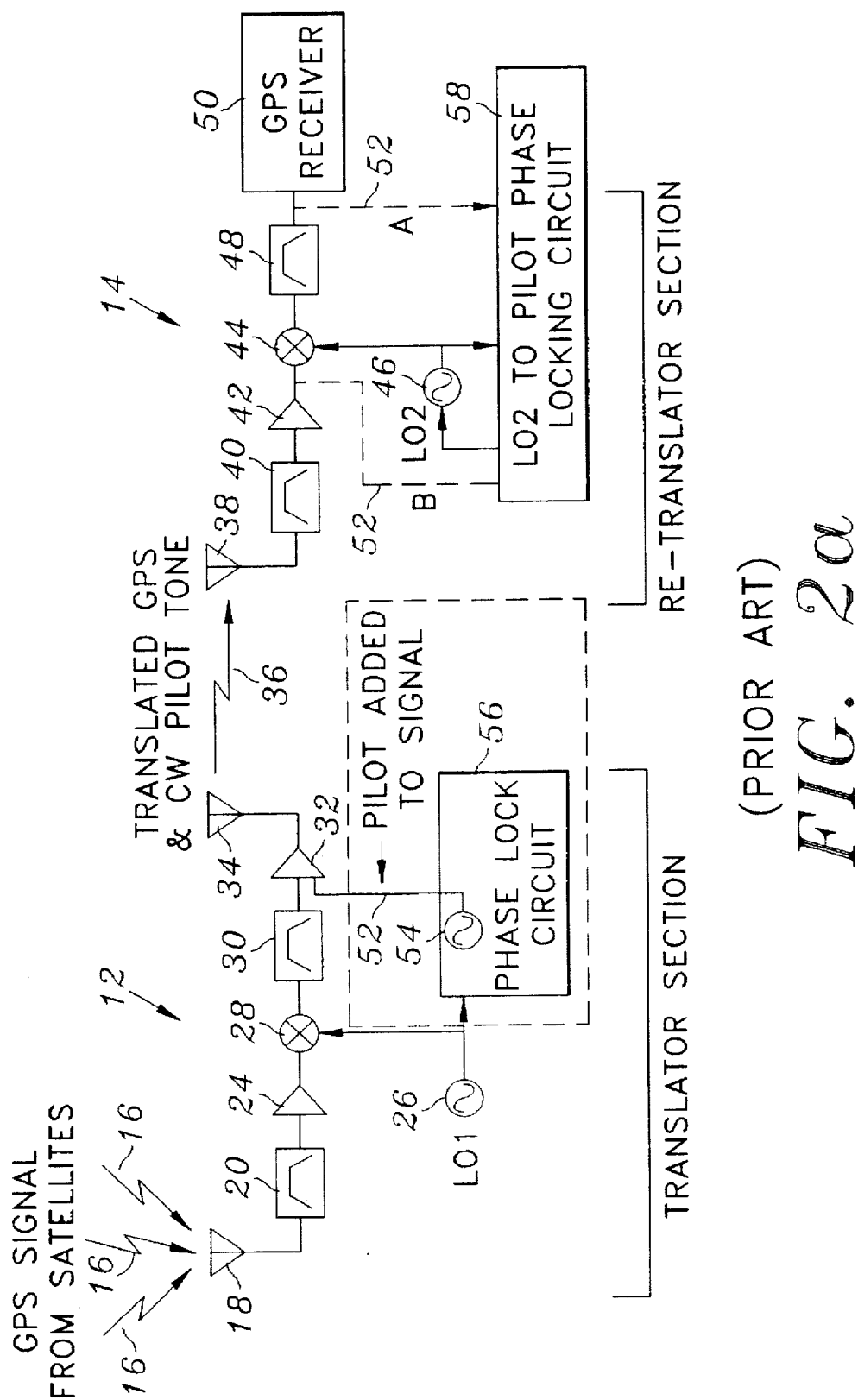

The retranslator 14 in the FIG. 2a arrangement retrieves the pilot tone either before or after the mixer 44 and applies it to a phase lock circuit 58 which effectively phase-locks oscillator 46 to oscillator 26. This arrangement, however, requires the pilot tone 52 to be inside the coherence range Of the signal 36 (about 30 KHz in the 900 MHz band when applied to a land-mobile system), or phase coherence between the pilot tone and GPS signal is lost.

Figure 2B:
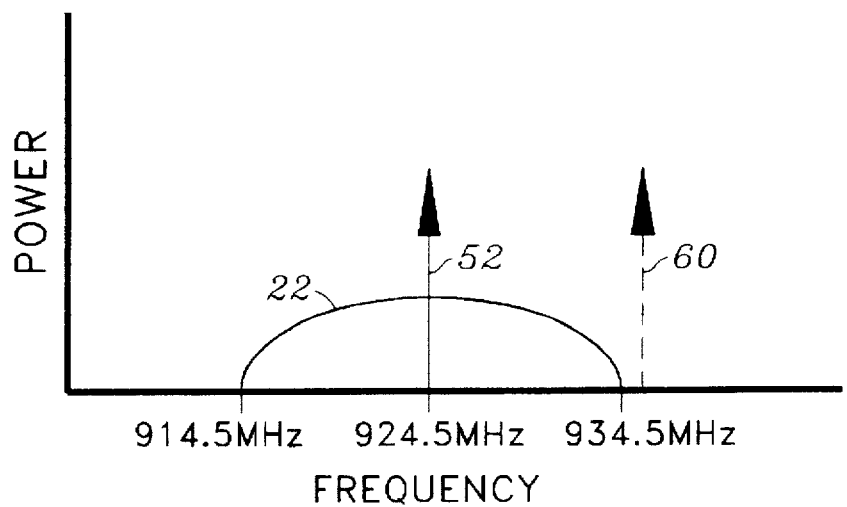

FIG. 2b shows that a CW pilot tone 52 lying inside the coherence band is essentially at the center frequency of the envelope 22 of the translated GPS signal 36 (which is typically 2–20 MHz wide) and is therefore subject to interference-by the GPS signal. Positioning the pilot tone outside the envelope 22, as e.g. at 60 in FIG. 2b, overcomes this problem but limits the use of the system to applications where the coherence bandwidth is wider than the GPS signal bandwidth.

Figure 3B:
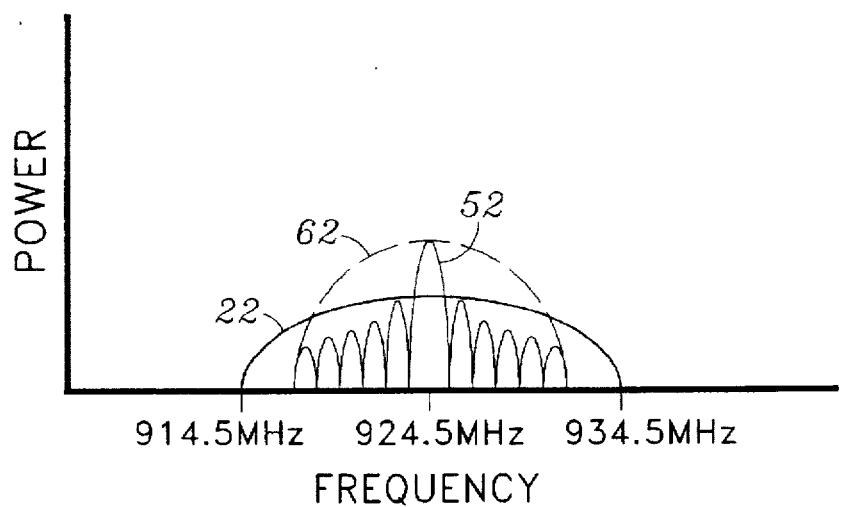
FIG. 3b is a frequency power diagram illustrating an exemplary spread spectrum modulation of the pilot tone in accordance with the invention.
Figure 3A:
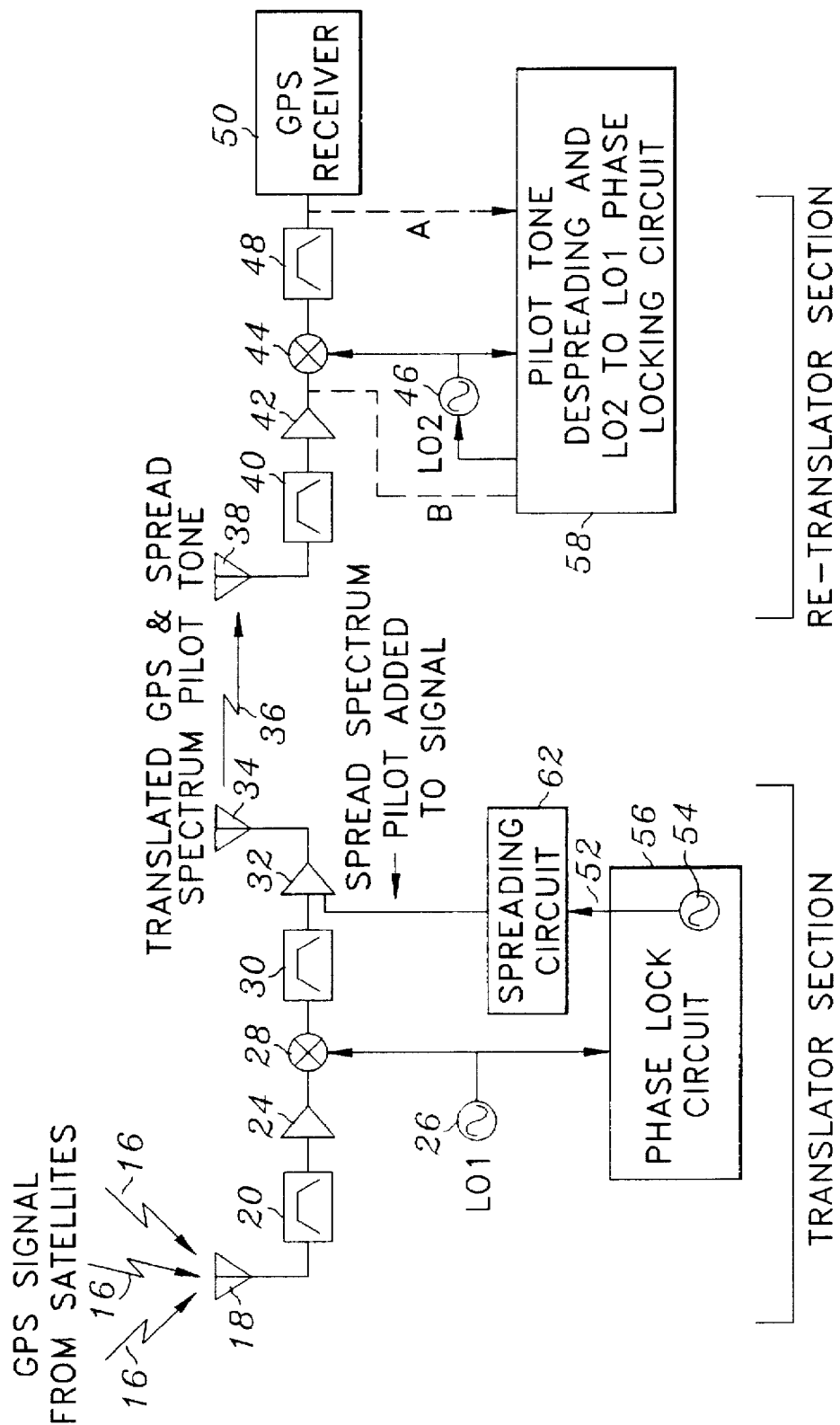
FIG. 3a is a block diagram illustrating an exemplary GPS translator subsystem using the invention.
Figure 4:
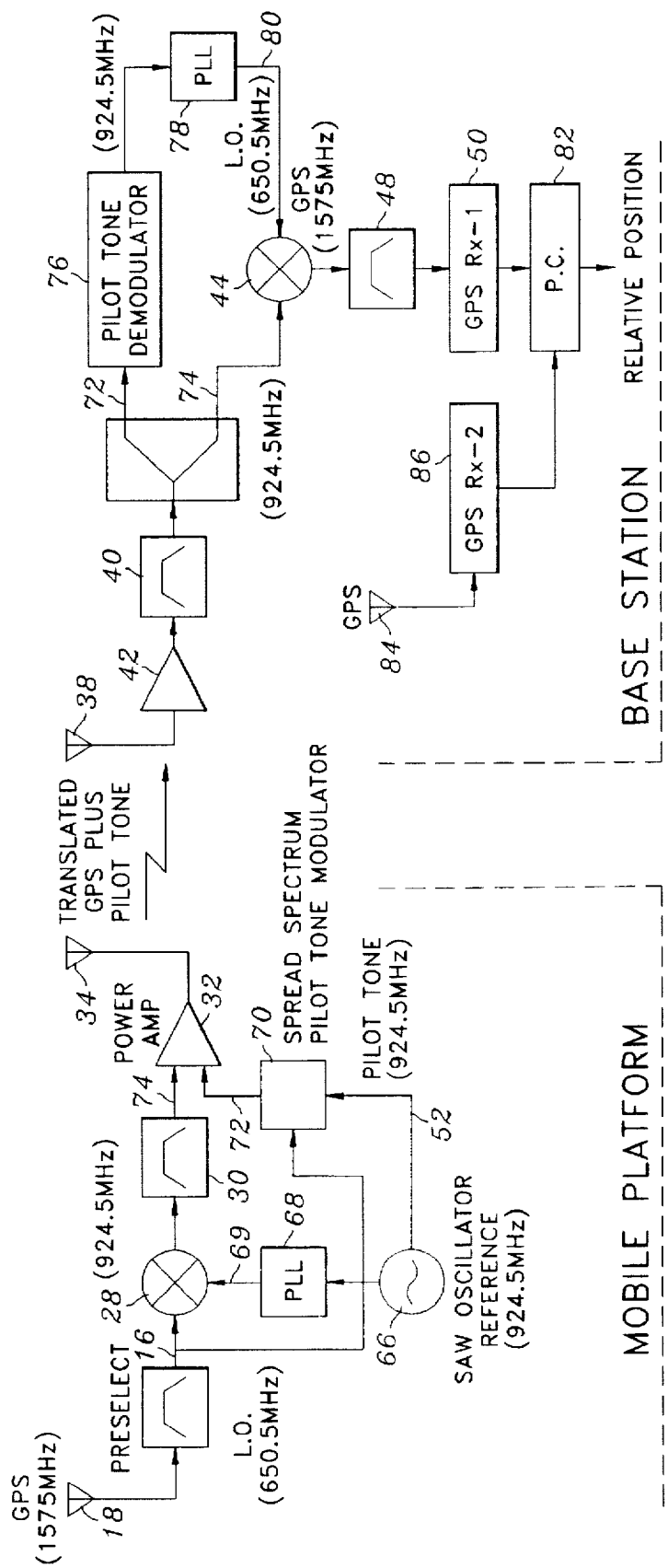
FIG. 4 is a block diagram illustrating a preferred embodiment of the invention.

The GPS translator of this invention is illustrated in FIGS. 3a–b and 4, the latter depicting a presently preferred embodiment of the invention. FIG. 3a shows the inventive translation system in general terms. The circuitry of FIG. 3a is the same as that of FIG. 2a except for the addition of a spreading circuit 62 between the pilot tone oscillator 54 and the amplifier 32, and the addition of pilot tone despreading functions to the phase lock circuit 58. As illustrated in FIG. 3b, the spectrum spreading of pilot tone 52 results in a pilot tone frequency-power spread within an envelope 64 as the pilot tone is spread by a series of pseudo-random phase shifts (0/1800) in accordance with a predetermined code. Because the code which controls-the spreading of the GPS signal is known, a phase shift sequence (code) can readily be developed for the pilot tone which assures that the translated GPS signal and the pilot tone are compatible. Consequently, the center frequency of the pilot tone envelope 62 can be identical to the center frequency of the translated GPS signal envelope 22 without disrupting the operation of the translator.

FIG. 4 shows a specific preferred embodiment of the invention. The raw 1575 MHz GPS signal is received, as in FIG. 1, by the mobile platform 12 over antenna 18 and is applied to a preselector/amplifier 64. A 924.5 MHz reference oscillator 66 provides a reference to a phase lock loop circuit 68 that produces a 650.5 MHz local oscillator signal 69 to the mixer 28, which mixes it with the raw 1575 MHz GPS signal 16. The band pass filter 30 selects the 924.5 MHz output 74 of the mixer 28 and supplies it to the power amplifier 32.

The 924.5 MHz signal from reference oscillator 66 constitutes the pilot tone 52 which is applied to the spread spectrum pilot tone modulator 70. The modulator 70 adds phase modulation to the pilot tone 52 within the frequency envelope 62 (FIG. 3b) under the control of a predetermined spreading code. The resulting spread spectrum pilot tone 72 is also applied to power amplifier 32, and the combined translated GPS signal and pilot tone are transmitted by antenna 34.

At the base station 14, the combined signals are received by antenna 38, amplified at 42, and band-pass filtered at 40 for the frequency band encompassed by the envelopes 22 and 62 of FIG. 3b. The received combined signal is then applied to both the pilot tone demodulator 76, and the up-conversion mixer 44.

The spread spectrum pilot tone 72 is now applied to a demodulator 76 which reverses the action of modulator 70 to reconstitute the 924.5 MHz pilot tone 52. The reconstituted tone 52 serves as a reference which can be applied to a phase lock loop circuit 78 that serves as a local oscillator and provides the mixer 44 with a 650.5 MHz input signal 80 whose phase exactly tracks the phase of the 650.5 MHz signal 69 put out by phase lock loop 68.

When the 1575 MHz output of mixer 44 is selected by band pass filter 48, an exact duplicate of the raw GPS signal 16 received by the mobile platform 12 is applied to the GPS receiver 50. When that signal is decoded and applied to a computer 82 which is also supplied with base station GPS information received by the GPS antenna 84 of the base station 14 and decoded by GPS receiver 86, the relative positions of the base station 14 and the mobile platform 12 can readily be calculated.

The inventive translation system described herein is largely immune to interference from hostile persons or forces not only because spread spectrum signals are difficult to jam, but also because the combined translated GPS and spread spectrum pilot tone signals are not readily recognizable as a GPS signal with pilot tone phase tracking. In addition, the distribution of the pilot tone energy over a wide band of frequencies makes the pilot tone legal, according to FCC regulations, in bands such as the ISM band of frequencies used for some land mobile communications. In addition, the circuitry of the inventive translation system is relatively simple and inexpensive and lends itself well to civilian applications such as, for example, emergency transponders where cost and size are significant factors.

It is understood that the exemplary translation system described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

What is claimed is:

1. A translator for translating Global Positioning System (GPS) signals received by a platform for retransmission to a base station, comprising:
   a) apparatus adapted to receive a raw GPS signal, said raw GPS signal being a spread spectrum signal with a first center frequency;
   b) translating circuitry arranged to translate said raw GPS signal into a translated GPS signal with a different center frequency, said translating circuitry including a local oscillator whose output, when mixed with said raw GPS signal, produces said translated GPS signal;
   c) a pilot tone generator connected to said translating circuitry and arranged to generate a pilot tone phase-locked to said local oscillator output;
   d) modulating circuitry operatively connected to said pilot tone generator and arranged to phase modulate said pilot tone in a predetermined pattern to produce a spread spectrum pilot tone; and
   e) a transmitter associated with said platform and arranged to transmit said translated GPS signal and said spread spectrum pilot tone.

2. The translator of claim 1, in which the center frequency of said spread spectrum pilot tone is substantially the same as the center frequency of said translated GPS signal.

3. The translator of claim 1, in which said translating circuitry includes:
   i) a reference oscillator which also serves as said pilot tone generator;
   ii) a phase lock loop circuit connected to said reference oscillator and arranged to produce an intermediate frequency signal phase-locked to said reference oscillator; and
   iii) a mixer connected to said receiving apparatus and said phase lock loop to produce said translated GPS signal.

4. The translator of claim 3, in which said intermediate frequency is such that the center frequency of said translated GPS signal is substantially the same as the frequency of said reference oscillator.

5. The translator of claim 1, in which said predetermined pattern is so chosen that the spreading sequence of said spread spectrum pilot tone is at any given time substantially different from the spreading sequence of said translated GPS signal at that time.

6. A Global Positioning System (GPS) signal translation apparatus, comprising:
   a) a base station in a known first location;
   b) at least one platform in a second location unknown to said base station;
   c) a translator at said platform including:
      i) apparatus for receiving a raw GPS signal usable for identifying said second location, said raw GPS signal being a spread spectrum signal with a first center frequency;
      ii) translating circuitry arranged to translate said raw GPS signal into a translated GPS signal with a different center frequency, said translating circuitry including a local oscillator whose output, when mixed with said raw GPS signal, produces said translated GPS signal;
      iii) a pilot tone generator connected to said translating circuitry and arranged to generate a pilot tone phase-locked to said local oscillator output;

iv) modulating circuitry operatively connected to said pilot tone generator and arranged to phase shift said pilot tone in a predetermined pattern to produce a spread spectrum pilot tone; and d) a transmitter associated with said second location and arranged to transmit said translated GPS signal and said spread spectrum pilot tone.

7. The apparatus of claim 6, further comprising:

e) a receiver at said base station arranged to receive said translated GPS signal and spread spectrum pilot tone;

f) a re-translator at said base station including:
  i) a splitter operatively connected to said base station receiver;
  ii) a demodulator operatively connected to said splitter and arranged to reconvert said spread spectrum pilot tone to a single-frequency pilot tone of the same frequency and phase as said phase-locked pilot tone;
  iii) a local oscillator phase-locked to said demodulator and arranged to produce a signal substantially identical in frequency and phase to said local oscillator output at said platform; and
  iv) re-translating circuitry operatively connected to said demodulator and splitter arranged to combine said translated GPS signal and the output of said phase-locked local oscillator so as to reproduce said raw GPS signal; and g) apparatus at said base station arranged to compute said second location on the basis of said raw GPS signal.

8. A method for translating Global Positioning System (GPS) signals received by a platform for transmission to a base station, said method comprising the steps of:

a) receiving a raw GPS signal, said raw GPS signal being a spread spectrum signal with a first center frequency;

b) translating said raw GPS signal into a translated GPS signal with a different center frequency, said translating circuitry including a local oscillator whose output, when mixed with said raw GPS signal, produces said translated GPS signal;

c) generating a pilot tone phase-locked to said local oscillator output;

d) changing the phase of said pilot tone in a predetermined pattern to produce a spread spectrum pilot tone; and e) transmitting said translated GPS signal and said spread spectrum pilot tone.

9. The method of claim 8, in which the center frequency of said spread spectrum pilot tone and said translated GPS signal are substantially the same.

10. The method of claim 9, further comprising the steps of:

f) receiving said translated GPS signal and said spread spectrum pilot tone at said base station;

g) separating said spread spectrum pilot tone from said translated GPS signal;

h) recovering from said spread spectrum pilot tone a pilot tone of the same frequency and phase as said phase-locked pilot tone i) providing a local oscillator at said base station phase-locked to said recovered pilot tone; and j) combining the output of said base station local oscillator with said translated GPS signal to produce at said base station a raw GPS signal indicative of the position of said platform.

* * * * *